United States Patent
Campion et al.

(10) Patent No.: US 6,409,872 B1
(45) Date of Patent: *Jun. 25, 2002

(54) IDENTIFICATION CARD PRINTER AND LAMINATOR

(75) Inventors: Kevin R. Campion; I. Tony Haugen, both of Minnetonka; Gary M. Klinefelter, Eden Prairie; Jeffrey D. Upin, Edina, all of MN (US)

(73) Assignee: Fargo Electronics, Inc., Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,396

(22) Filed: Nov. 6, 1998

(51) Int. Cl.$^7$ ................................................. B32B 31/00
(52) U.S. Cl. ..................... 156/264; 156/277; 156/517; 156/521; 283/75; 283/109
(58) Field of Search ................................ 156/517, 521, 156/264, 277; 283/75, 76, 77, 78, 107, 109, 112

(56) References Cited

U.S. PATENT DOCUMENTS

| | | | |
|---|---|---|---|
| 3,193,430 A | * 7/1965 | Messmer et al. | 156/521 X |
| 4,457,964 A | 7/1984 | Kaminstein | 428/43 |
| 4,617,080 A | 10/1986 | Kobayashi et al. | 156/359 |
| 4,938,830 A | * 7/1990 | Cannistra | 156/270 |
| 5,079,901 A | * 1/1992 | Kotsiopoulos | 225/4 X |
| 5,238,524 A | 8/1993 | Seki et al. | 156/538 |
| 5,277,501 A | 1/1994 | Tanaka et al. | 400/120 |
| 5,290,067 A | * 3/1994 | Langen | 283/60.1 |
| 5,437,960 A | 8/1995 | Nagate et al. | 430/256 |
| 5,484,502 A | 1/1996 | Bozanic | 156/235 |
| 5,573,621 A | 11/1996 | Boreali | 156/256 |
| 5,637,174 A | 6/1997 | Field et al. | 156/256 |
| 5,673,076 A | 9/1997 | Nardone et al. | 347/171 |
| 5,783,024 A | 7/1998 | Forkert | 156/351 |
| 5,785,224 A | 7/1998 | Nowakowski | 225/4 |
| 5,807,461 A | 9/1998 | Hagstrom | 156/361 |
| 5,873,606 A | * 2/1999 | Haas et al. | 283/75 |
| 5,874,145 A | * 2/1999 | Waller | 428/42.1 |
| 6,283,188 B1 | * 9/2001 | Maynard et al. | 156/351 |

FOREIGN PATENT DOCUMENTS

EP  0 278 517 A2  2/1988

* cited by examiner

*Primary Examiner*—Mark A. Osele
(74) *Attorney, Agent, or Firm*—Westman, Champlin & Kelly, P.A.

(57) ABSTRACT

A laminator for laminating sheets of lamina onto substrates such as cards uses a web of lamina material that preferably has a bondable and printable layer on the reverse side and can then be printed with information and laminated onto a blank card. The web also preferably has a series of spaced transverse lines of reduced strength so the web can be separated into individual sheets of lamina by creating a tension in the web across the transverse line of reduced strength.

11 Claims, 6 Drawing Sheets

IDENTIFICATION CARD PRINTER AND LAMINATOR

BACKGROUND OF THE INVENTION

The present invention relates to an apparatus for bonding a heat bondable lamina onto a card that forms a substrate. The lamina is separable into sheets that fit the cards closely. Informational materials can be printed either on the cards or on the lamina.

Laminated cards are widely used as drivers licenses, identification cards, and other types of cards on which information is printed, and then a lamina is placed over the card to protect the printing. Particularly, a card shaped substrate is made from a suitable material such as a plastic, cardboard or the like, and information such as photographs, personal data, text and graphics are required to be carried on the card so that it can be used for identification easily. In some instances, holographic images and other optical or magnetically stored information will be present on the card.

The present device permits selectively utilizing a lamina that is provided from a web on supply roll and which can be separated into sections without cutting. The lamina is made so printing can be applied to the reverse side of the lamina, if desired, and then laminated onto a face of a card or substrate. Alternately, the card may be preprinted and the lamina bonded into place with a heat sensitive layer.

Another problem that has arisen in the use of laminated cards is the ability to lift the plastic lamina from the substrate and alter or change the printed information and then subsequently replace the lamina after the alteration has been completed. In order to obviate that, it is important that the edges of the lamina do not protrude from the card at any place, unlike the square corner of standard lamina used on the rounded corners of standard substrates as cards.

SUMMARY OF THE INVENTION

The present invention provides apparatus and methods for placing lamina onto a substrate, such as a card, and heat bonding the lamina in place with little waste of lamina material.

In one preferred form, the lamina is constructed with a printable vinyl layer that will be placed to overlie the substrate and used for heat bonding to the substrate. Since a vinyl layer also can carry printed material, printing may be applied to the reverse or inner side of the lamina, and then the lamina will be bonded to a card that has no printing. The lamina may be provided as an elongated web on a supply roll, and then separated into individual substrate sized sheets. The sheets are brought into registry with the substrates or cards and heat bonded in place.

A further preferred embodiment utilizes a roll having a web of lamina material from which the successive of sheets are separated from each other along micro perforated lines or equivalent that extend transversely to the length of the web. Scallops are formed at intervals along the edges of the web and aligning scallops are joined by the micro perforated lines so that by placing a snap-load on the web visually smooth end edges are formed for the individual lamina sheets. The scalloped portions along the edges of the roll of material are rounded to conform to the corners of the cards or substrates. The lamina sheets are precisely sized and configured to the corners of the substrates or cards, so that the lamina can be of size to cover the entire area of the card with no edges of the lamina extending beyond the card at the rounded corners.

In this preferred embodiment, the printing can take place on a reverse side of the lamina, or the cards can be preprinted and then covered with the lamina sheets. The sheets are separated without cutting, but by exerting a tensile load across the microperforations which form a reduced strength line.

In all forms of the apparatus, the lamina can be multiple layered and include a polyester outer layer, and a layer of material such as a holographic imaging system layer bonded to the polyester layer in a known manner, and then a layer of vinyl bonded to the holographic image layer. The vinyl can be printed upon, and is on the reverse side, of the laminate so it also is bonded to the core or substrate forming the card. If the reverse side of the laminate carries the needed printing, the card or substrate can be blank. Alternatively, a vinyl layer may be used and printed upon on the reverse side and bonded directly to a card or substrate without using a polyester layer or a holographic layer.

The apparatus shown accurately places the laminate sheets onto the cards. The web is either easily separated into sheet segments with the printing either on the reverse side of the lamina or on the card, depending on the configuration of the apparatus desired.

DETAILED DESCRIPTION OF THE PREFERRED EMBODIMENTS

Figure 1:
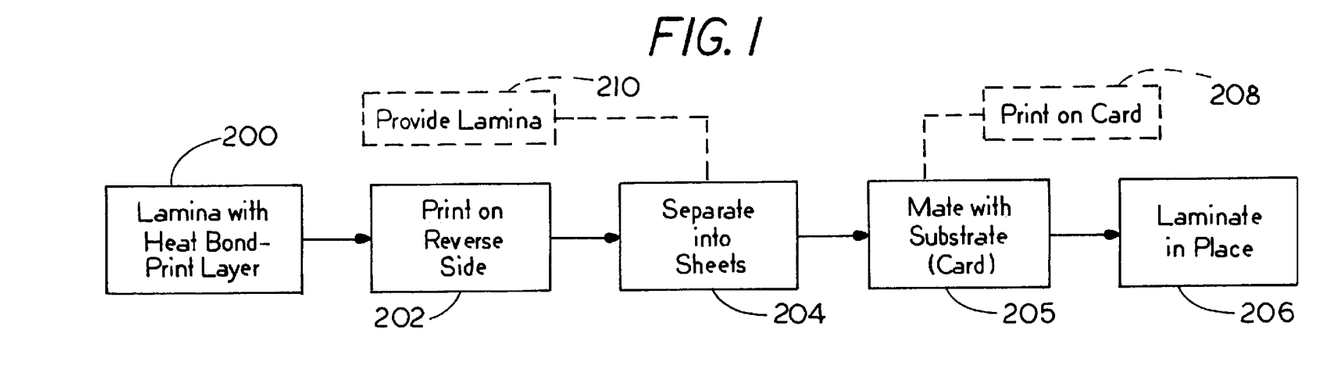
FIG. 1 is a flow diagram showing the steps of operation of a preferred form of the apparatus of the present invention.
Figure 2:
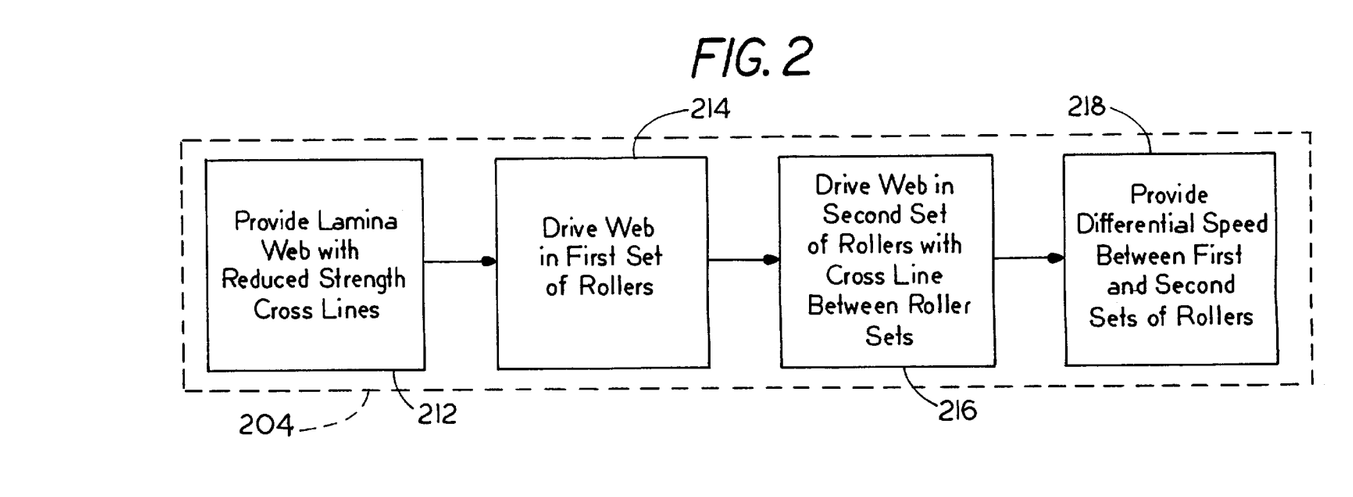
FIG. 2 is a flow diagram of a method of separating sheets of lamina from a web stored on a roll into individual sheets that cover the individual substrates or cards.

Referring to FIGS. 1 and 2, box 200 is a step of providing a web of lamina material on a roll with a heat sensitive layer on its reverse side, that is the side that would not be exposed when the lamina material is laminated to a substrate. The web of lamina is moved from the roll through a printer for printing on the reverse side of the lamina represented at 202. The layer of the web that is heat sensitive also is a layer that can be printed upon. Then, the lamina is separated into sheets, at step 204. The apparatus is used to guide and the individual sheet segments to mate with a card as indicated at step 205, and the substrate or card, and the lamina sheet are laminated in place using heat as indicated by step 206.

Alternatively, the card can be printed as indicated by the step 208, and in which instance, the lamina can be provided without printing, as indicated by the step 210. The lamina web would be merely separated into the card size sheets and mated with the preprinted card at step 205 and laminated in place at step 206.

FIG. 2 shows details of the separating step 204 to separate the web from a roll into individual lamina sheets, without using a cutter. As shown at step 212, the lamina is provided with weakened or reduced strength cross lines, preferably microperforations, aligned with notches or scallops at the edges of the web. Then the web is driven in a first set of drive or pinch rollers that will drive the lamina web from the supply roll as indicated at 214. The lamina web, before separating the sheets, is received by a second set of pinch or drive rollers with the reduced strength or weakened transverse line across the lamina web between the first and second sets of pinch rollers as indicated in step 216, and then as indicated at 218, a differential in speed between the first and second sets of rollers is provided to introduce tension in the lamina material that is sufficient to separate the sheets from the roll supply across the weakened portion or perforated portion. The tension preferably is a "snap" or sudden tension load. This can be done by providing a sudden stop to the trailing set of rollers, or a sudden acceleration to the leading rollers provides a "snap" action, or in other ways. This avoids the need for providing a cutter or a cutting mechanism of any sort. Microperforations for the line of reduced strength leave a smooth edge that makes the sheets easy to handle.

Figure 6:
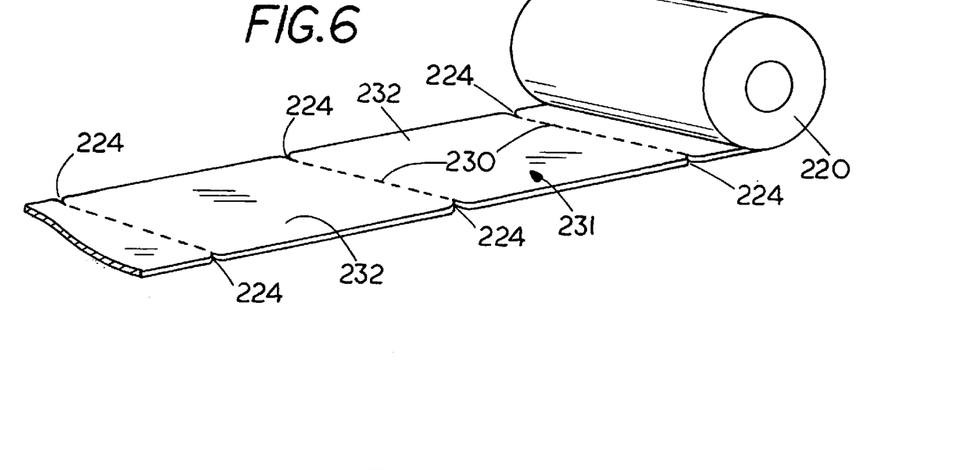
FIG. 6 is a perspective view of a supply roll of a web of lamina material illustrating the regions of reduced strength for separating the lamina into individual sheets.
Figure 7:
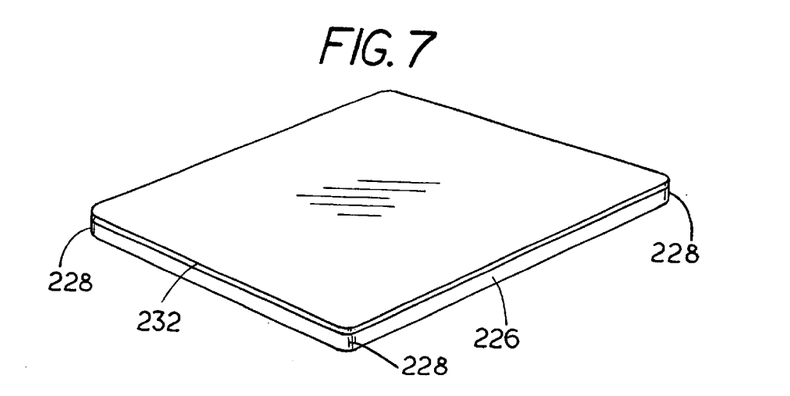
FIG. 7 is a perspective view of a card having a sheet of lamina bonded thereto.
Figure 8:
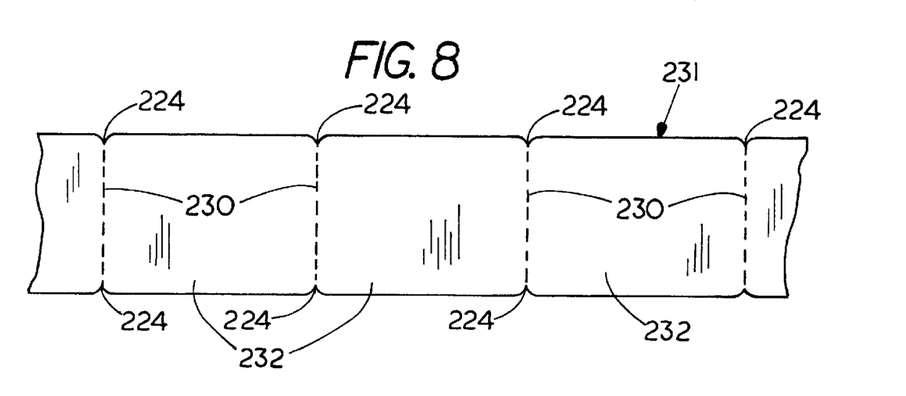
FIG. 8 is a schematic flat layout of a web of lamina material.

Referring to FIGS. 6, 7 and 8 to illustrate the reduced strength transverse cross lines, a supply roll 220 of a web 230 of lamina material, which will be explained in greater detail, but which includes a sheet to protect information on a printed card, and a heat sensitive bonding layer on the reverse side that would laminate to a substrate or card. The web 231 is provided with a plurality of evenly-spaced aligning scallops or notches indicated at 224 along opposite edges, with the scallops 224 being rounded to conform to the rounded corners of a typical card indicated at 226, FIG. 7 showing rounded corners 228. The scallops 224 meet at a junction, and a microperforated transverse line 230 of reduced strength is provided laterally across the web 231. The web 231 is thus divided into individual lamina sheets 232 of selected standard card size and shape, such as CR80 type cards. The microperforations are spaced so that the individual sheets will be the same size as a card 226. When indexed appropriately and laminated onto the card the sheets 232 will come all the way out to the edges and to the corners of the cards or substrates without protruding at the corner where the lamina could be grasped and lifted. The use of the scallops 224 permits the close fit, and true edge to edge printing on all of the card surface, if the reverse side printing is used.

Figure 9:
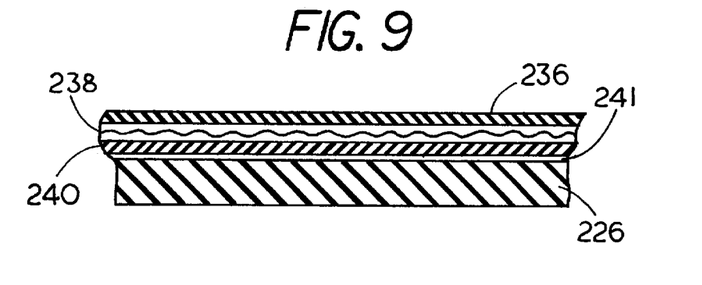
FIG. 9 is an enlarged fragmentary sectional view of a first form of lamina.
Figure 10:
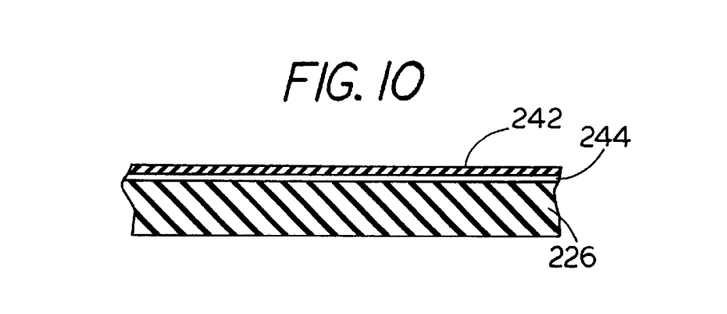
FIG. 10 is an enlarged fragmentary sectional view of a second form of lamina.

The web 231 of lamina can take several different forms, but preferably, the lamina would be a sheet one of two layered forms indicated in FIGS. 9 and 10, respectively. In FIG. 9, the lamina is shown as having a polyester over layer or outer layer 236 that would be exposed to the elements when laminated onto a card, which is indicated at 226, a holographic system layer 238 which is well-known in the field, and comprises a layer that can be bonded to polyester using a suitable adhesive, and permit the holograms to be put into place, and other information recorded. A vinyl layer 240 would then be bonded to the holographic layer 238, and would be used for either printing or directly adhering to the substrate or card illustrated at 226. When the reverse side of the lamina is printed, the printing is indicated at 241.

Another embodiment could be a cartridge or housing of precut sheets of lamina that can be fed individually, using a known feeder.

A simplified form of the web that is provided as a lamina is shown in FIG. 10, and includes a vinyl layer 242, that would be directly laminated to the substrate 226, or a printing layer 244 can also be provided on the vinyl before laminating in accordance with the subsequent disclosure.

In the discussion, when mention is made of printing on the reverse side of the web or lamina, it is meant that this is the side that would be in contact with the substrate, and the printing would be so that it was readable when the lamina was laminated to the substrate.

Figure 3:
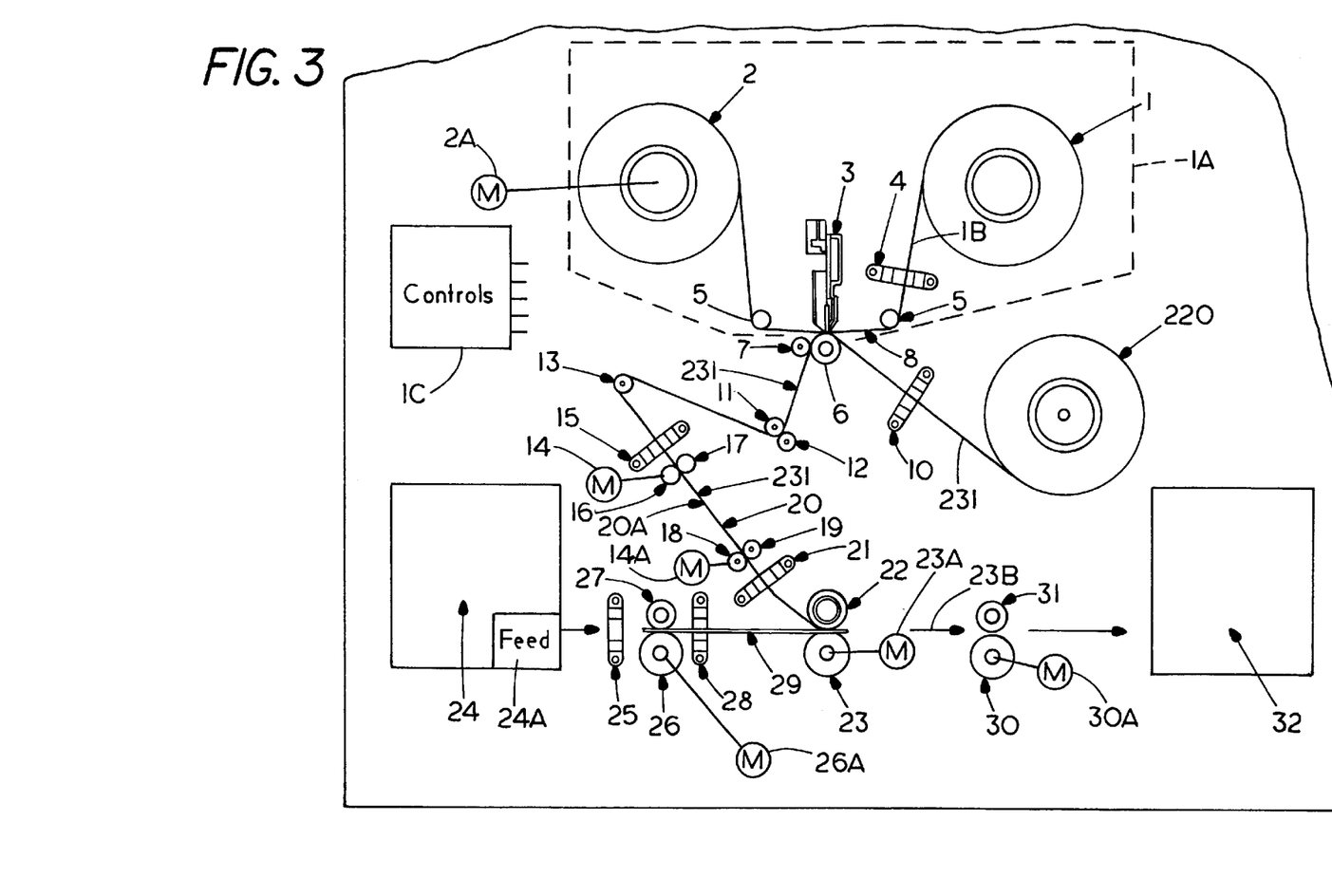
FIG. 3 is a side part-schematic view of an apparatus made according to the present invention in a first preferred form.

Referring to FIG. 3, apparatus is shown for laminating an overlayer of material unto substrates or cards. A printer assembly 1A is outlined in dotted lines and is of the dye-sublimation type that utilizes a printer ribbon actuated with a printing head assembly. The printer ribbon 1B is taken from a supply roll and is taken up by a take-up roll 2, which is suitably driven from a motor 2A. The motor 2A is a stepper motor that is controlled by a main control 1C, which is a logic type controller that sequences operations of the overall laminating assembly. The print ribbon 1B passing a sensor 4 which is used for insuring that a ribbon is present so that the printing head 3 can operate against a platen 6 as desired. Idler rollers 5 are used for guiding the print ribbon 1B in its desired path over the platen roller 6.

The lamina web supply roll 220 is illustrated schematically and is rotatably mounted on the frame that is used for the printer. The web 231 passes a sensor 10, and then passes up over the platen roller 6, as guided by a guide roller 7. The reverse side, or the vinyl side of the web 231, for example, that is shown in either FIG. 9 or 10, is passed under the print head 3, so that the reverse side of the lamina may be printed on to include the desired message. The web 231 then passes through suitably rotatable mounted guide rollers 11 and 12, and up over a further guide roller 13 for the desired path of travel, and passes through a sensor 15 for sensing presence of the web and providing desired information.

A pair or set of web drive or pinch rollers 16 and 17 are rotatably mounted on side frame plates and receive the web. The set of drive rollers 16 and 17 include a drive roller 16 that is driven from a stepper motor 14. The roller 17 is a pinch roller or pressure roller that is spring loaded against the drive roller 16 so that positive drive of the web is achieved. The web is then fed into a second set of drive or pinch rollers 18 and 19, which also includes a stepper motor 14A driving roller 18. The stepper motor 14 and 14A are individually controlled from the control 1C of the unit. The roller 19 is a pinch roller constructed in a known manner for driving various sheets of material as well as webs.

The speed of the first set of drive rollers 16 and 17 and the speed of the second set of drive rollers 18 and 19 are controlled by the respective stepper motors 14 and 14A. When the web 231 is positioned with a reduced strength cross line between the first and second sets of drive rollers, varying the speed of the sets of rollers relative to each other will place a tension load on the web and cause the separation across the region of reduced strength. The split or separation of a sheet 20 is indicated at 20A. An individual lamina sheet shown at 20 will be held in the second set of drive rollers 18 and 19.

This individual sheet 20 is directed past a sensor 21 which will provide a signal indicating when the leading edge of the individual sheet that has been severed passes through, and also when the leading edge of the next sheet, which remains attached to the web, is received so that the motors 14 and 14A can be driven to provide the tension on the web between the rollers 16 and 17 and the rollers 18 and 19 to again break out or separate out a lamina sheet 20. Lamina sheet 20 is then driven by the rollers 18 and 19 through the sensor 21 to a set of laminating rollers including a heated roller 22, and a laminating platen roller 23 that are suitably driven also through a stepper motor indicated at 23A. The signal from the sensor 21 is used to bring a substrate and the lamina sheet into registry.

A substrate or card supply hopper 24 has a card feeder of conventional design indicated only schematically at 24A and feeds cards, such as that shown at 29, past a first sensor 25 where they are gripped by feed roller such as a drive rollers 26 driven with a stepper motor 26A and an idler roller 27. The card 29 passes through a sensor that senses the card presence, and then a second sensor 28 which provides signals to the controls for determining the card position just prior to entry into the laminating rollers. The card 29 is then fed by stepper motor 26A to position it when correlated with a signal from a sensor 21 for the lamina sheet 20, so that the lamina sheet 20 and the leading edge of the card 29 are precisely aligned as they go through the laminating rollers including the heater roller 22 and the driven platen roller 23. The laminated card, which is then covered with a lamina sheet 20 and with the reverse side printing of the sheet printed, is moved as indicated by the arrow 23B to a set of transport rollers 30 and 31 that are driven again by suitable stepper motor 30A. The laminated cards are then deposited in a discharge hopper illustrated schematically at 32.

In this form of the apparatus shown in FIG. 3, the steps of the process illustrated in FIG. 1 are followed, with reverse side printing on the web of lamina, that is, on the side which is ultimately laminated to a substrate or card 29. The separation of the web into individual lamina sheets 20 is done by using a line of reduced strength across the web and providing a suitable tension load on the web between the first and second sets of rollers to cause the separation.

Figure 4:
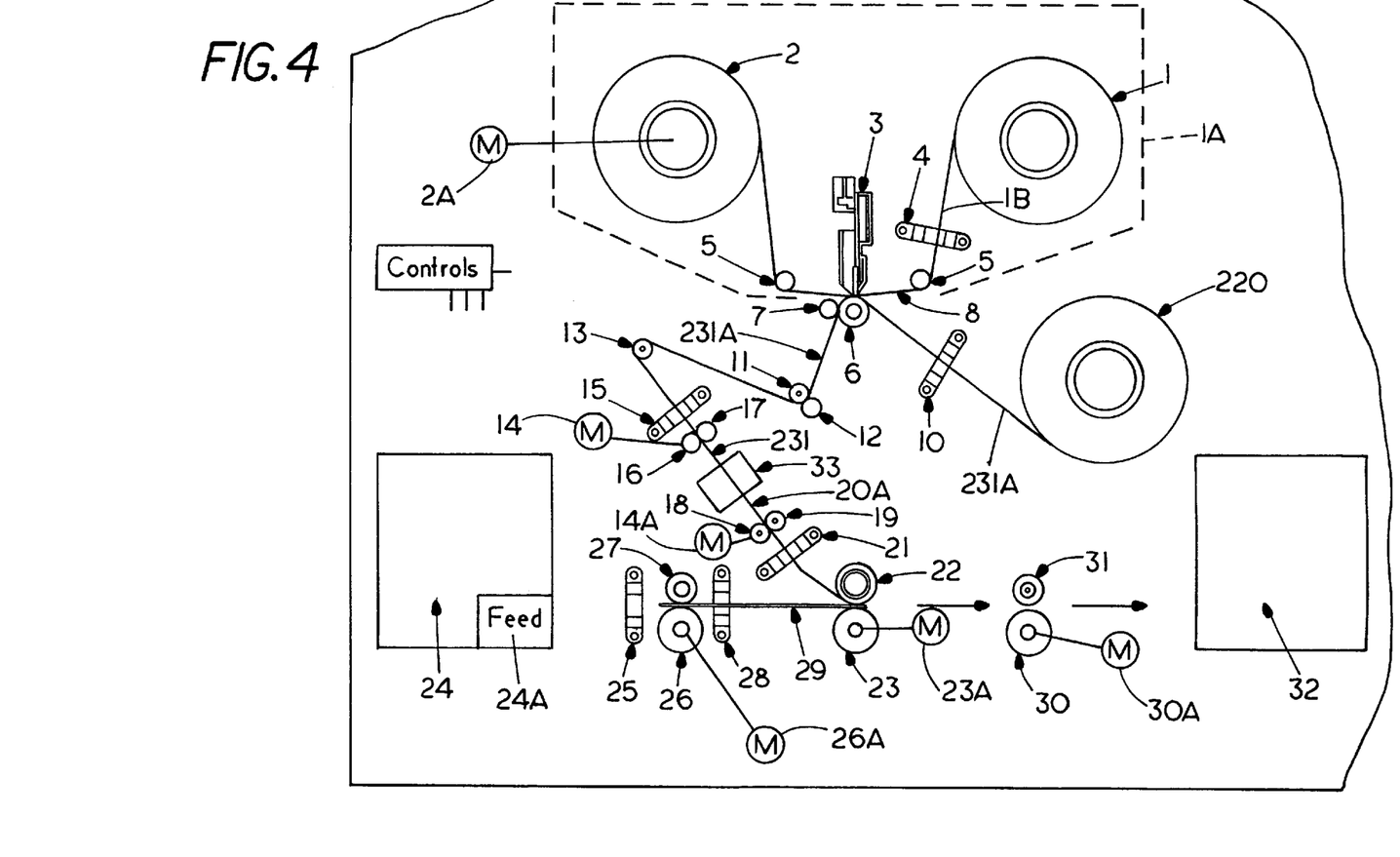
FIG. 4 is a modified form of the device of FIG. 3.

In FIG. 4, the apparatus is exactly the same as it is shown in FIG. 3, except that in place of controlling the motors 14 and 14A to create a tension in the web and cause separation of individual sheets 20 by lines of reduced strength across the web, a web of lamina without the scallops and without the lines of reduced strength is carried on the roll 220, and the web, indicated at 231A passes through a cutter 33 that is positioned between the first set of drive roller 16 and 17 and the second set of drive roller 19, and in response to a signal from the sensor 21 and the controls 1C, the cutter is operated to sever the web 231A into individual sheets 20A that would be laminated to cards 29 in exactly the same manner as described in connection with FIG. 3.

The web 231A would be printed on the reverse side, as previously stated, and then using the cutter 33 severed into the individual sheets of lamina 20A and laminated onto a substrate or card 29. If desired, the scallops could be used on the web 231A, but there is no need for the microperforations. The use of the scallops would enhance the ability to use the full surface of the card for information by having the rounded corners that would match with the rounded corners of the card, as shown in FIG. 7.

If desired in FIG. 4 the sensor 21 can be movably mounted so that any size lamina, limited only by the range of movement of the sensor, may be determined and separated at the time of cutting.

Again, the process shown in FIG. 1 is followed, but the separation of lamina sheets is not carried out as shown in FIG. 2, but separation is by using the cutter 33.

Figure 5:
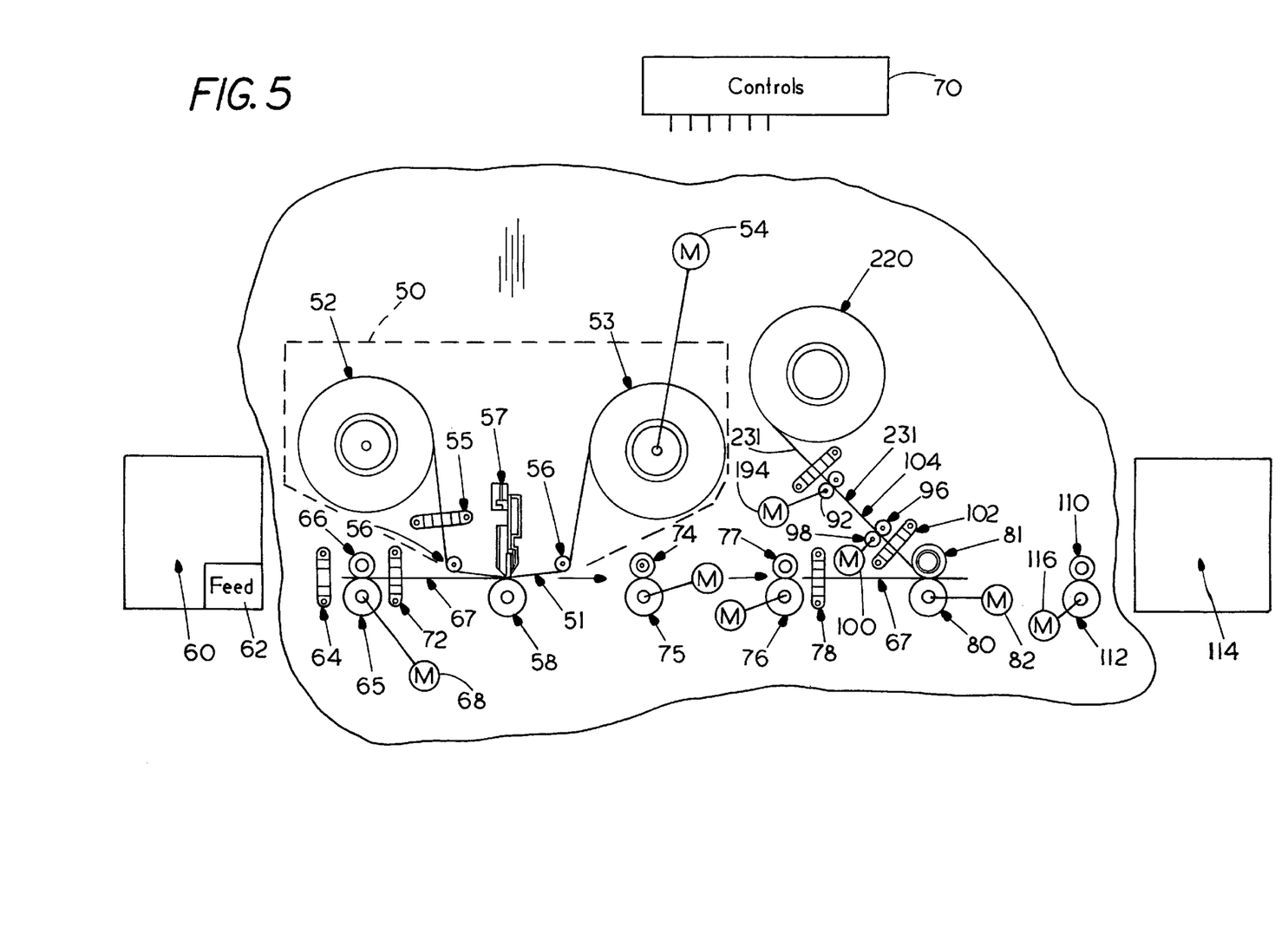
FIG. 5 is a further modified form of the invention including a printer for printing cards prior to laminating to a substrate.

FIG. 5 is a modified form of the invention, in which the cards are printed, and individual sheets of lamina are separated using the cross microperforated lines of reduced strength across the web from the supply. As shown in FIG. 5, a printer section 50 is the same as the printer section 1A shown in FIG. 3, but it is used for printing onto cards in this form of the invention. The printer ribbon is indicated at 51, and is provided from a supply roll 52 to a take-up roll 53 which is driven from a motor 54. This is a stepper motor again, that controls the feeding of the printer ribbon for dye-sublimation printing. Again, any desired type of printer can be used. A sensor 55 is provided to sense presence of the ribbon, and the ribbon extends over guide rollers 56, 56 so that it is guided across a print head 57 that is in registry with a platen 58.

A card supply 60 has a card feeder 62 that feeds cards as indicated by the arrow 63 past a sensor 64 and into a pair of card drive rollers 65 and 66, which are used to drive the card shown at 67 in its path of travel. The roller 65 is driven from a suitable stepper motor 68 from central controller indicated here at 70 which controls the various functions including the printer 50, and the stepper motors. The controller receive signals from the sensor 64 and a second sensor 72 that senses when a card is moved through the card feed rollers 65 and 66.

As the card 67 passes over the platen 58, it is printed with information controlled by the print head 57 using the ribbon 51, and thus has information on its upper surface. The card 67 is fed through further card feed rollers 74 and 75, and through a set of transport rollers 76 and 77 that support and guide the card past a sensor 78. The card shown at 67A has been printed on, and is passed into the laminating rollers 80 and 81. The roller 81 is a heated roller and the roller 80 is driven from a stepper motor 82 controlled by the controller 70.

A lamina supply roll 220 provides the web 231 that has the crossed lines of reduced strength, and it is rotatably mounted on a frame and is used for laminating onto the preprinted card 67. The web 231 passes through a sensor 90 into a first set of feed rollers 91 and 92. The roll 92 is a driven roll, while the roll 91 is a pressure roller. The roll 92 is driven from a stepper motor 94 under control of the control section 70.

A second set of drive rolls 96 and 98 are provided spaced from the first set of drive rolls a selected distance. The second set of drive rolls includes a driven roll 98 that is driven from a stepper motor 100 that also is controlled by the control 70. A sensor 102 is provided downstream from the second set of drive rolls 96 and 98, and between the drive rolls 96 and 98 and the laminating set of rolls 80 and 81.

Figure 11:
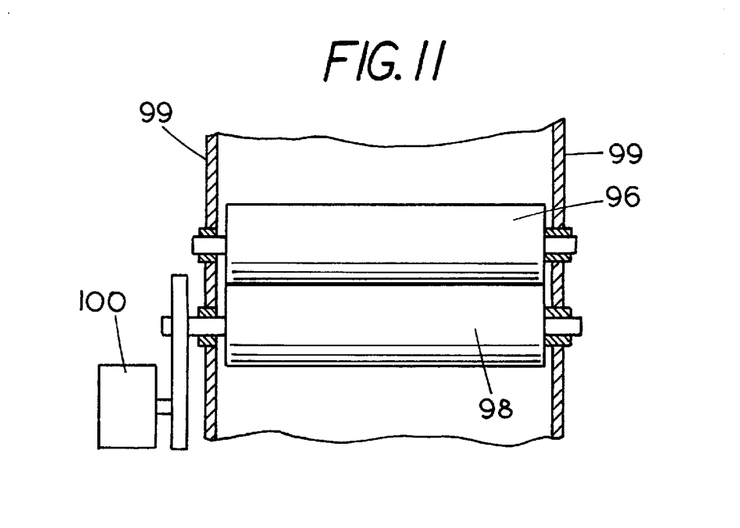
FIG. 11 is a schematic sectional view of a typical set of snap drive rollers used for driving sheets of lamina.

A schematic side view of the rollers 96 and 98 is shown in FIG. 11. The rollers are rotatably mounted on frame plates 99 in bushings. The rollers 96 can be driven by a gear from roller 98, if desired. A gear set can be used between the stepping motor and roller 98. The sensor 102 will sense the leading edge of web 231, and will provide a signal to the controller 70 so that the first set of feed rolls 91 and 92 and the second set of feed rolls 96 and 98 will be differentially driven by their respective motors 94 and 91 to create a tension in the web and provide a separation of the web to form individual sheets 104 of the lamina by breaking the individual sheet 104 off from the rest of the web along a cross line of reduced strength.

Then, the signal from the sensor 102 is used for ensuring that the leading edge of the sheet 104 is properly aligned with the leading edge of the card 67 as they are fed into the laminating rollers 80 and 81 so that the lamination can take place with the lamina sheet 104 precisely positioned relative to the card of substrate 67. Transport rollers 110 and 112 will receive the card after lamination, and will move the card into an output hopper 114 in a conventional manner. The roller 112 is drive with a suitable stepper motor 116 as shown. All of the stepper motors are coordinated in movement through the controller 70 in precise positioning of the card as well as the lamina sheet 104 can be achieved.

The use of the reduced strength cross line or microperforated cross line on the web for separating out the individual lamina sheets sized to be identical to the size of the substrate or card being used eliminates the need for a separate cutter, thereby reducing costs by eliminating parts and reducing some complexity because of the need for normally quite precisely operating the cutter so that the lamina sheet that will be laminated onto the substrate is the right size.

Also as stated, the use of the scallops along the edges of the web of lamina material makes the lamina sheets that are formed to be the exact configuration and size of the card so that a greater area of the card is available for having printing displayed thereon. This printing can either be on the reverse side of the lamina itself, or on the card as disclosed herein.

Although the present invention has been described with reference to preferred embodiments, workers skilled in the art will recognize that changes may be made in form and detail without departing from the spirit and scope of the invention.

What is claimed is:

1. An apparatus for printing on a continuous web of material and laminating a sheet of lamina carrying printing onto a substrate comprising a supply of lamina in the form of a continuous web, the continuous web having transverse lines of reduced strength to define a plurality of sheets of lamina, a printhead for printing information on the lamina, a web drive for moving the web past the printhead, the web drive including guide rollers for controlling movement of the web after the web has been printed including a first set of drive rollers and a second set of drive rollers spaced apart from and receiving the web from the first set of drive rollers, first and second controllable drives to the first and second sets of drive rollers to provide differential drive speed to create tension in the web between the first and second sets of drive rollers and to cause separation of an individual sheet of lamina carrying printing from the continuous web between the first and second sets of drive rollers, the first and second controllable drives operating the first and second set of drive rollers by at least one of reducing the speed of the first set of drive rollers and increasing the speed of the second set of drive rollers, the second set of rollers moving the individual sheet toward a set of laminating rollers positioned to directly receive the individual sheet from the second set of rollers, a source of a substrate movable in a path separated from a path of movement of the sheet of lamina, said substrate comprising a card, a pair of card feed rollers for feeding a card directly into the set of laminating rollers, a third controllable drive for driving the card feed rollers, a first sensor between the second set of rollers and the set of laminating rollers, a second sensor between the card drive rollers and the set of laminating rollers, a controller for controlling the second and third controllable drives in response to signals from the first and second sensors to control driving the separate sheet and a card with the second set of rollers and the card drive rollers directly to the set of laminating rollers wherein the sheet of lamina and a substrate are laminated together.

2. The apparatus of claim 1 wherein the web of lamina material has a printable layer on a reverse side thereof that faces a substrate when lamination occurs, and the printhead printing information on the reverse side of the lamina material.

3. The apparatus of claim 2 wherein the lamina has a layer of vinyl forming the reverse side thereof.

4. The apparatus of claim 1 wherein the web has a pair of laterally spaced, longitudinally extending side edges, and at least one pair of scallops on the side edges, the pair of scallops being transversely aligned on opposite edges to define a line of reduced strength across the web.

5. The apparatus of claim 4 wherein a micropreforated line extends across the web between the aligned scallops.

6. The apparatus of claim 1, wherein the first and second controllable drives operate the first and second sets of drive rollers by reducing the speed of the first set of drive rollers relative to the second set of drive rollers when a transverse line of reduced strength of the web is between the first and second sets of drive rollers.

7. The apparatus of claim 6, wherein the first and second controllable drives operate the first and second sets of drive rollers by increasing the speed of the second set of drive rollers relative to the first set of drive rollers when a transverse line of reduced strength of the web is between the first and second sets of drive rollers.

8. The apparatus of claim 6, wherein the first set of drive rollers is reduced in speed by a sudden stopping of the first set of drive rollers.

9. A method of providing a protective lamina on a substrate comprising providing a web of lamina material with a heat bondable layer on a reverse side thereof and with transverse weakened lines at spaced intervals, printing information on the reverse side of the web in selected locations between a pair of transverse weakened lines, driving the web with first and second spaced sets of drive rollers subsequent to printing, driving the first and second sets of rollers to move the web in a direction from the first set of drive rollers to the second set of drive rollers, selecting at least one of the steps of driving the first drive rollers at a reduced speed relative to the second set of drive rollers, and driving the second set of drive rollers at an increased speed relative to the first set of drive rollers to create a tension in the web for separating the selected locations at the transverse weakened lines into separate sheets of lamina, sensing a position of a leading edge of a separated sheet while held in the second set of rollers, driving the substrate with a third set of rollers toward a set of laminating rollers, sensing a position of a leading edge of the substrate while the substrate is held in the third set of rollers, using the sensed positions of the separated sheet of laminate for controlling the second and third sets of rollers to mate the separated sheet with a substrate and driving the second set of rollers and the third set of rollers to move the separate sheet and substrate directly to the laminating rollers.

10. A combination of printing, separating, and laminating apparatus for printing information to be maintained on a card substrate laminated with an overlay, comprising a printer including a supply of a web having a printable layer on a first side thereof, a printhead for printing information on the first side of the web, a web drive for moving the web past the printhead, the web drive including guide rollers for controlling movement of the web into and past the printhead, and for moving the web after printing on the first side has been completed, a first set of drive rollers to receive the web from the printhead and move the web past the printhead for printing, a second set of drive rollers spaced from the first set of drive rollers, and receiving the web from the first set of drive rollers and operable to sever the web into individual printed sheets of the size of cards for laminating onto cards with the printed material visible when on the card, a laminating station comprising a set of laminating rollers including a heated roller, a source of cards, a set of card drive rollers for driving the cards prior to entry into the laminating station, a second sensor for sensing the leading end of a card while held in the card drive rollers, a first sensor for sensing a position of a leading end of the individual sheets separated from the web while held by the second set of rollers, controllable motors for driving the first and second sets of drive rollers, and for driving the laminating rollers for sequentially moving the card and one of the individual sheets carrying printing through the laminating rollers, a controller receiving signals from the sensors for controlling the motors for coordinating the movement of the card and the individual sheets, as driven by the second set of rollers and card drive roller to index the card and an individual printed sheet for lamination, the individual printed sheets and the card being aligned as they are driven by the second set of rollers and card drive rollers and enter the laminating rollers, the heated roller laminating the printed surface of an individual printed sheet against an aligning card, to thereby provide a protected layer of printing on the card.

11. The apparatus of claim 10, wherein the motors for the first and second drive rollers are controlled by the controller to selectively provide one of reducing the speed of the first set of drive rollers and increasing the speed of the second set of the drive rollers relative to the speed of the movement of the web through the printer, the web having weakened lines transversely across the web that are positioned between the first and second set of rollers when the controllable drives are selectively operated.

* * * * *